(12) United States Patent
Barzee (10) Patent No.: US 6,567,105 B1
(45) Date of Patent: May 20, 2003

(54) METHOD AND APPARATUS FOR USER-INTERFACE ENHANCEMENT

(75) Inventor: Rex A. Barzee, Fort Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/493,430

(22) Filed: Jan. 29, 2000

(51) Int. Cl.[7] .................................................. G06F 3/00
(52) U.S. Cl. ...................................... 345/762; 345/764
(58) Field of Search .............................. 345/762, 764, 345/733, 744, 589, 838, 835; 209/203, 219

(56) References Cited

U.S. PATENT DOCUMENTS 5,487,141 A * 1/1996 Cain et al. .................. 345/744
6,057,845 A * 5/2000 Dupouy ....................... 345/854
6,353,448 B1 * 3/2002 Scarborough et al. ...... 345/762

* cited by examiner

Primary Examiner—Cao (Kevin) Nguyen
(74) Attorney, Agent, or Firm—Jack A. Lenell (57) ABSTRACT

An automated method and apparatus for determining the extent of user-interface enhancement capabilities available to a user, and for providing appropriate control signals to employ such user-interface enhancements. The invention includes providing a computer coupled with a user-interface having an extent of enhancement capabilities available to the user. The invention automatically determines the extent, and generates control signals to employ the enhancements within the extent. The control signals are then transmitted from the computer to the user-interface.

21 Claims, 1 Drawing Sheet

FIG. 1

METHOD AND APPARATUS FOR USER-INTERFACE ENHANCEMENT

FIELD OF THE INVENTION

The invention is generally directed to computer or data processing systems, and more particularly is directed to user-interfaces for such computer or data processing systems.

BACKGROUND OF THE INVENTION

For various computer systems and networked computer systems, there are commands, for example unix commands (usually small programs)that produce plain ASCII text as output. These commands typically write their output to a generic file or file descriptor within a program, for example stdout for the unix system. For the example of Stdout, this may be a reference to a user's terminal window, computer network browser window or the like, which would cause the output to be displayed in that terminal or browser window. Alternatively, Stdout may be a reference to a named file on the filesystem, or it may be a reference to a pipe which would cause the output text to become the input of another command.

It is important that these text producing programs are able to output only plain text because, as just stated, their output may become the input of another program, and the second program expects and can process only plain ASCII text as its input. Some of these text producing commands are ls, find, grep, od, whereis, who, whoami, xd, etc.

As explained above, plain text is necessary as input for other commands. However, when text is output to a terminal window for a user (human) to read and analyze, the human is more productive if that text is colored or highlighted in a sensible manner to aid the human in processing the information contained in the text. Most modern terminal windows are capable of interpreting and processing embedded control sequences and highlighting or coloring surrounding text according to these control sequences.

Unfortunately, the required control sequences vary depending upon the terminal window being used. For instance, to turn on red foreground, the hpterm terminal requires the sequence <Esc>&v1S, but the dtterm and color-xterm terminals require the sequence <Esc>[31 m, where in both cases <Esc> is the ASCII escape character (numbered 27 in decimal and 1b in hexadecimal).

To enable text producing commands to output both plain text and text with control sequences, a software provider could write two or more versions of each text producing command, one to output plain text only and the other(s)to output text with control sequences. Or the software provider could write a single version of the command with additional command line options to turn on or off the output of control sequences and to determine which group of control sequences to use.

However, both such schemes would place an additional burden upon the user. With the former scheme, the user would: i)have to know that two versions exist; ii) realize that he is or is not sending the output of the text producing command to another program; and iii) remember the correct command name, i. e. the name for the one that produces control sequences or the name for the one that doesn't (depending on what he wants), and type the correct name.

Additionally, the former scheme is limited by requiring two or more versions of the command with nearly the same functionality. This results in increased disk space to store multiple versions of the command, and possibly more bugs or defects because the multiple versions, although very similar in functionality, may not share any source code.

With the latter scheme, the user would have to i) realize that he or she is not sending the output of the text producing command to another program, ii) remember what the command line options are to produce or not produce control sequences embedded in the output text (depending on what he or she wants), iii) remember the command option to select terminal window type he or she is currently using, and iiii) type the correct options.

Given these difficulties a single text producing program would ideally output only plain text when its output is going to a file or as input to another program, and would output the same plain text but with embedded control sequences that will provide display enhancements in the terminal window, for example, highlight and/or color the plain text, in a way meaningful to the user.

Furthermore, a single text producing command would ideally differentiate among terminal window types and output the correct control sequences for the terminal window being used.

What is needed is an automated method and apparatus for determining an extent of user-interface enhancement capabilities available to a user, and for providing appropriate control signals to employ such user-interface enhancements.

SUMMARY OF THE INVENTION

The invention provides an automated method and apparatus for determining the extent of user-interface enhancement capabilities available to a user, and for providing appropriate control signals to employ such user-interface enhancements.

If information is presented employing user-interface enhancement capabilities, for example capabilities for coloring or highlighting selected text in a sensible manner, then the information is more understandable and more easily read and analyzed, and accordingly the user is more productive. The invention advantageously provides for automatic employment of such capabilities without burdening the user.

Briefly, and in general terms the invention includes providing a computer coupled with a user-interface, and automatically determining the extent of available enhancement capabilities of the user-interface. The invention generates control signals to employ the enhancements within the extent, and transmits the control signals from the computer to the user-interface.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
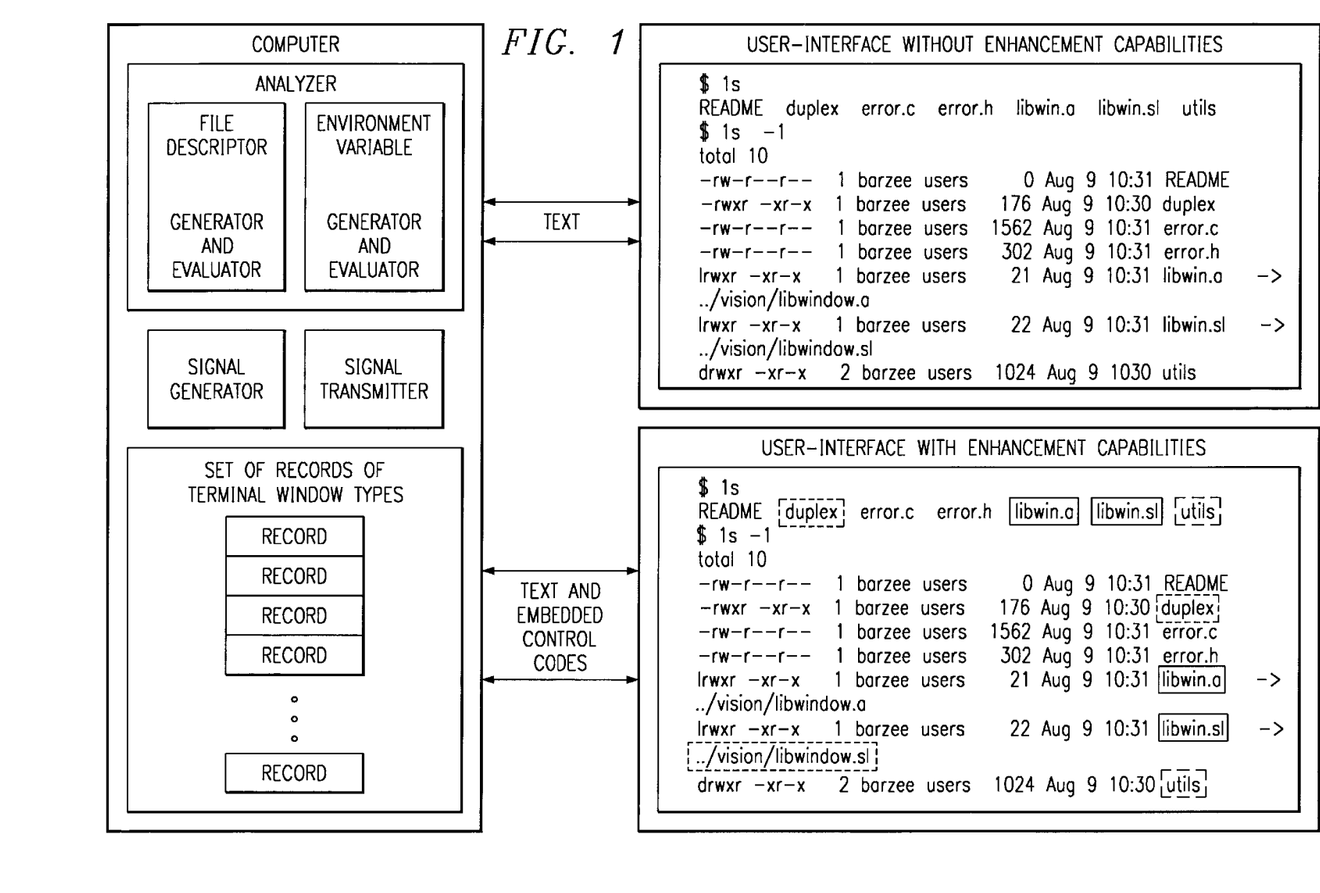
FIG. 1 shows a simplified block diagram of a preferred embodiment of the invention.

In FIG. 1 a simplified block diagram illustrates a preferred embodiment of the invention. As shown, the invention includes a suitably programmed computer. Coupled with the computer is a user-interface, for example a video display terminal, without enhancement capabilities. For contrasting illustrative purposes, also shown is another user-interface with an extent of enhancement capabilities, for example, including color highlighting capabilities. As representatively illustrated by double headed arrows in FIG. 1, each of the two user-interfaces are responsively coupled with the computer, for example, through a computer network, wherein the computer executes suitable network protocol software. As will be discussed in greater detail subsequently herein, the invention advantageously provides automatic determination of respective extent of any enhancement capabilities of each of the user-interfaces coupled with the computer.

Of course, it should be understood that the invention is not limited to color highlighting capabilities. Other enhancement capabilities may be employed in conjunction with the invention with beneficial results. Examples of other enhancement capabilities include, but are not limited to: text is slightly blurred or shadowed for de-emphasis; text is spoken in different people's voices, each voice conveying a different emphasis or meaning; text is spoken in monotone for de-emphasis; text is spoken in different voices (deep versus high; male versus female; differing regional accents; fast versus slow articulation pace; differing emotional inflections); text is sung for emphasis, different background music or sound effects are played while the text is spoken or displayed, text is physically raised for emphasis, the user interface and/or depiction vibrate or move to give emphasis to text.

In FIG. 1, within the block of the user-interface WITHOUT enhancement capabilities is an example depicting a display of output from the standard unix command ls (executed initially in default mode and then with the –l option.) It should be noted that the lines that starts with "$" are the prompt and the command typed by the user. As shown in FIG. 1, the user-interface WITHOUT enhancement capabilities generates its exemplary display depiction in response to control signals (including ASCII encoded text), which it receives through the computer network from the computer.

Within the block of the user-interface WITH enhancement capabilities is an alternative example depicting an enhanced display of output from the standard unix command ls. For this example where the extent of enhancement capabilities includes color highlighting capabilities, file names of executable files (duplex, libwindow.sl) are highlighted with a green background color, names of symbolic links (libwin.a, libwin.sl) are highlighted with a teal background color, and directory names (utils) are highlighted with a yellow background color. As shown in FIG. 1, the example of the user-interface WITH enhancement capabilities generates its alternative enhanced display depiction in response to alternative control signals (including embedded control codes within the ASCII encoded text) that it receives through the computer network from the computer.

Such different color highlight backgrounds are representatively illustrated in FIG. 1 using boxes having a respective different line style type corresponding to each different color. Accordingly, in FIG. 1 file names of executable files (duplex, libwindow.sl) are shown boxed with a stippled " . . . " line style type, names of symbolic links (libwin.a, libwin.sl) are shown boxed with a solid line style type, and directory names (utils) are shown boxed with a dashed " - - - " line style type.

In the preferred embodiment, computer functions are implemented within the computer by appropriate software running on one or more processors of the computer, or by appropriate computer hardware, or by appropriate combinations thereof. Accordingly, such functions are representatively illustrated in FIG. 1 by various functional blocks. As particularly shown, the computer includes an analyzer for automatically determining the respective extent of enhancement capabilities of each of the user-interfaces coupled with the computer. Also included is a generator of respective control signals as shown in FIG. 1 to employ enhancements within the respective extent of each of the user-interfaces. Also included is a transmitter of the respective control signals for conveyance thereof from the computer each of the user-interfaces, preferably using the computer network and the network protocol software.

As shown in FIG. 1, and as discussed in greater detail subsequently herein, the analyzer includes a generator and evaluator of respective file descriptors corresponding to each of the user-interfaces. In the preferred embodiment, these provide for determining whether such file descriptors reference a respective terminal window of the user-interfaces. Terminal window as used herein is defined sufficiently broad so as to include terminal window, browser window and the like.

As shown in FIG. 1, the analyzer also includes a environment variable generator and evaluator. The analyzer is adapted for accessing a set of records of terminal window types and for determining whether the environment variable corresponds to a member of the set. The control signal generator is adapted for determining sequences of the embedded control codes based on the corresponding member record.

In the preferred embodiment, the invention automatically enables a single version of a text producing program (such as the example ls) to output only plain text when necessarily limited by the extent of user-interface enhancement capabilities available to the user, and to output the same text with embedded control sequences for user-interface enhancements, for example color and/or highlight, when the text will be viewed by a user in a terminal window having such user-interface capabilities. Furthermore the invention enables a text producing program to output the correct control sequences for the terminal window where the output will be viewed by a user.

Upon startup of appropriate software of an extended text producing program incorporating the functional blocks of the analyzer just discussed, the computer automatically determines whether its output will go to a terminal window by calling the POSIX.1 standard function isatty( ) for the file descriptor where output will be sent (typically stdout). If isatty( ) returns 1, the file descriptor references a terminal window and the extended program examines the environment variable, TERM. and from this determines which group of control sequences it will output. Accordingly, if isatty( ) returns 1 and TERM contains a known terminal window type name, the extended text producing program engages the signal generator and signal transmitter depicted as functional blocks in FIG. 1 for purposes of outputting text to the user-interface WITHOUT enhancement capabilities, and alternatively outputting text with the correct embedded control sequences to the user-interface WITH enhancement capabilities.

In the preferred embodiment, the signal generator is embodied using software that automatically sets a pointer to point to (or passing a pointer) to an array that contains the correct control sequences, where in the case of not outputting control sequences the pointer is set to point to an array of empty strings. Alternatively, a global variable is set indicating to its various functions they should produce control sequences and which sequences or pass such a variable to its various text producing functions, where the functions have been extended to check this variable and produce control sequences accordingly.

For example, the following Appendix 1 includes C source code (and pseudocode/comments), ls.c, which particularly illustrates:

1. The function "SetFormats( )", which calls isatty( ) and checks the environment variable "TERM" as discussed previously herein.
2. The function SetFormats( ) illustrates pointer usage as discussed previously herein. SetFormats( ) sets a pointer, "FORMATS", to an array of control sequences based on the output of issatty( ) and the environment variable.

Another alternative way of embodying the signal generator and transmitter for outputting text with the correct embedded control sequences is creating an instance of an object that produces the control sequences. Yet another alternative way is setting function pointers to point to functions that produce control sequences.

Example source code for creating the desired object instance is shown in the following Appendix 2, which includes a listing of C++ code, "term.cpp". The constructor for the class Driver (see Driver::Driver( ) in the code) calls isatty( ) and checks the environment variable "TERM" as discussed previously herein. This constructor creates a different "front end" depending upon the results of calling isatty( ) and checking "TERM". It creates an "AnsiFront" or a "HpFront", or a generic "Front" each of which output a different set of control sequences or none at all.

As discussed, the invention provides an automated method and apparatus for determining the extent of user-interface enhancement capabilities available to a user, and for providing appropriate control signals to employ such user-interface enhancements. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

APPENDIX 1 ls.c listing

```
/* ls - list contents of directories.
 * If output is to a terminal and the terminal can interpret color
 * escape sequences, use color to highlight file types. */
#include <stdio.h>
#include <stdlib.h>
#include <string.h>
#include <unistd.h>
typedef enum { NoType, Ordinary, Directory, Executable,
Fifo, Socket, Device, SymLink } FileE;
typedef struct {
const size_t n;
const char *const s;
} CnstStr;
typedef struct {
const CnstStr *on, *off, *name;
} FileColor;
typedef struct {
const char *name;
const char *user;
const char *group;
const char *target_name;
int len
FileE type;
FileE target_type;
uid_t uid;
gid_t gid;
ino_t ino;
mode_t mode;
nlink_t nlink; /* number of links to the file */
dev_t rdev; /* device ID (if file is character or block special) */
off_t size; /* file size in bytes (if fiie is a regular file) */
time_t atime; /* time of last access */
time_t mtime; /* time of last data modification */
time_t ctime; /* time of last status change */
long blksize; /* a filesystem-specific preferred I/O block size
for this object. In some filesystem types, this
may vary from file to file. */
long blocks; /* number of blocks of a filesystem-specific size
allocated for this object */
} FileInfo;
/* The empty string. Stored in array elements where no color, i.e.
 * escape sequence, is wanted. */
const CnstStr NONE = { 0, "" };
/* Escape sequences for a ANSI terminal. */
const CnstStr ANSI_ATTR_OFF = { 4, "\x1b[0m" }, /* Turn off all attributes,
                                                  including color */
          ANSI_FG_BLACK = { 5, "\x1b[30m" },
          ANSI_FG_RED   = { 5, "\x1b[31m" },
```

APPENDIX 1-continued ls.c listing

```
    ANSI_FG_GREEN = { 5, "\x1b[32m" },
    ANSI_FG_YELLOW = { 5, "\x1b[33m" },
    ANSI_FG_BLUE = { 5, "\x1b[34m" },
    ANSI_FG_MAGENTA = { 5, "\x1b[35m" },
    ANSI_FG_CYAN = { 5, "\x1b[36m" },
    ANSI_FG_WHITE = { 5, "\x1b[37m" },
    ANSI_FG_DEFAULT = { 5, "\x1b[39m" },
    ANSI_BG_BLACK = { 5, "\x1b[40m" },
    ANSI_BG_RED = { 5, "\x1b[41m" },
    ANSI_BG_GREEN = { 5, "\x1b[42m" },
    ANSI_BG_YELLOW = { 5, "\x1b[43m" },
    ANSI_BG_BLUE = { 5, "\x1b[44m" },
    ANSI_BG_MAGENTA = { 5, "\x1b[45m" },
    ANSI_BG_CYAN = { 5, "\x1b[46m" },
    ANSI_BG_WHITE = { 5, "\x1b[47m" },
    ANSI_BG_DEFAULT = { 5, "\x1b[49m" },
    ANSI_BOLD_ON = { 4, "\x1b[1m" },
    ANSI_FAINT_ON = { 4, "\x1b[2m" },
    ANSI_UNDERLINE_ON = { 4, "\x1b[4m" },
    ANSI_BLINKING_ON = { 4, "\x1b[5m" },
    ANSI_NEGATIVE_ON = { 4, "\x1b[7m" },
    ANSI_BOLD_FAINT_OFF = { 5, "\x1b[22m" },
    ANSI_UNDERLINE_OFF = { 5, "\x1b[24m" },
    ANSI_BLINKING_OFF = { 5, "\x1b[25m" },
    ANSI_NEGATIVE_OFF = { 5, "\x1b[27m" },
/* Escape sequences for a HP terminal. */
const CnstStr HP_FG_WHITE ={ 5, "\x1b&v0S" },
    HP_FG_RED ={ 5, "\x1b&v1S" },
    HP_FG_GREEN ={ 5, "\x1b&v2S" },
    HP_FG_YELLOW ={ 5, "\x1b&v3S" },
    HP_FG_BLUE ={ 5, "\x1b&v4S" },
    HP_FG_MAGENTA ={ 5, "\x1b&v5S" },
    HP_FG_CYAN ={ 5, "\x1b&v6S" },
    HP_FG_BLACK ={ 5, "\x1b&v7S" },
    HP_FG_DEFAULT ={ 5, "\x1b&v0S" },
    HP_INVERSE = { 4, "\x1b&dL" },
    HP_UNDERLINE = { 4, "\x1b&dD" },
    HP_ATTR_OFF = { 4, "\x1b&d@" }; /* Turn off inverse and
                                      underline */
/* Escape sequences for a PCL terminal (or printer). PCL stand for
 * Print Command Language. */
const CnstStr PCL_FG_BLACK = { 5, "\x1b*v0S" },
    PCL_FG_RED = { 5, "\x1b*v1S" },
    PCL_FG_GREEN = { 5, "\x1b*v2S" },
    PCL_FG_YELLOW = { 5, "\x1b*v3S" },
    PCL_FG_BLUE = { 5, "\x1b*v4S" },
    PCL_FG_MAGENTA = { 5, "\x1b*v5S" },
    PCL_FG_CYAN = { 5, "\x1b*v6S" },
    PCL_FG_WHITE = { 5, "\x1b*v7S" },
    PCL_UNDERLINE_ON = { 5, "\x1b&d0D" },
    PCL_UNDERLINE_OFF = { 5, "\x1b&d@" },
/* "Escape sequences" for an HTML terminal (or browser). */
const CnstStr HTML_ATTR_OFF = { 7, "</font>" },
    HTML_FG_RED = { 22, "<font color=\"#ef0000\">" },
    HTML_FG_GREEN = { 22, "<font color=\"#00e000\">" },
    HTML_FG_YELLOW = { 22, "<font color=\"#efef00\">" },
    HTML_FG_BLUE = { 22, "<font color=\"#0000ef\">" },
    HTML_FG_MAGENTA = { 22, "<font color=\"#ef00ef\">" },
    HTML_FG_CYAN = { 22, "<font color=\"#00efef\">" },
    HTML_FG_BLACK = { 22, "<font color=\"#000000\">" },
    HTML_FG_DEFAULT = { 7, "</font>" },
    HTML_BOLD_ON = { 3, "<b>" },
    HTML_BOLD_OFF = { 4, "<b>" },
    HTML_UNDERLINE_ON = { 3, "<u>" },
    HTML_UNDERLINE_OFF = { 3, "<u>" },
/* Color names surrounded with escape sequences to color the names in
 * their respective colors. */
const CnstStr ANSI_Ordinary = { 5, "white" },
    ANSI_Directory = { 15, "\x1b[33myellow\x1b[0m" },
    ANSI_Executable = { 14, "\x1b[32mgreen\x1b[0m" },
    ANSI_Fifo = { 12, "\x1b[31mred\x1b[0m" },
    ANSI_Socket = { 16, "\x1b[35mmagenta\x1b[0m" },
    ANSI_Device = { 13, "\x1b[34mblue\x1b[0m" },
    ANSI_SymLink = { 13, "\x1b[36mcyan\x1b[0m" },
    HP_Ordinary = { 5, "white" },
    HP_Directory = { 15, "\x1b&v3Syellow\x1b&v0S" },
    HP_Executable = { 15, "\x1b&v2Sgreen\x1b&v0S" },
```

APPENDIX 1-continued ls.c listing

```
    HP_Fifo = { 13, "\x1b&v1Sred\x1b&v0S" },
    HP_Socket = { 17, "\x1b&v5Smagenta\x1b&v0S" },
    HP_Device = { 14, "\x1b&v4Sblue\x1b&v0S" },
    HP_SymLink = (14, "\x1b&v6Scyan\x1b&v0S" },
    OPEN_Ordinary = { 5, "white" },
    OPEN_Directory = { 6, "yellow" },
    OPEN_Executable = { 5, "green" },
    OPEN_Fifo = { 3, "red" },
    OPEN_Socket = { 7, "magenta" },
    OPEN_Device = { 4, "blue" },
    OPEN_SymLink = { 4, "cyan" },
/* Array of escape sequences used when stdout is a tty and the terminal
 * type is ansi. */
const FileColor ANSI_FORMATS[] = {
{ &NONE,    &NONE,    &NONE }, /* No Type */
{ &NONE,    &NONE,    &ANSI_Ordinary },
{ &ANSI_FG_YELLOW, &ANSI_FG_DEFAULT, &ANSI_Directory },
{ &ANSI_FG_GREEN, &ANSI_FG_DEFAULT, &ANSI_Executable },
{ &ANSI_FG_RED,    &ANSI_FG_DEFAULT, &ANSI_Fifo },
{ &ANSI_FG_MAGENTA, &ANSI_FG_DEFAULT, &ANSI_Socket },
{ &ANSI_FG_BLUE,   &ANSI_FG_DEFAULT, &ANSI_Device },
{ &ANSI_FG_CYAN,   &ANSI_FG_DEFAULT, &ANSI_SymLink }
};
/* Array of escape sequences used when stdout is a tty and the terminal
 * type is hpterm. */
const FileColor HP_FORMATS[] = {
{ &NONE,    &NONE,    &NONE }, /* No Type */
{ &NONE,    &NONE,    &HP_Ordinary },
{ &HP_FG_YELLOW, &HP_FG_DEFAULT, &HP_Directory },
{ &HP_FG_GREEN, &HP_FG_DEFAULT, &HP_Executable },
{ &HP_FG_RED,    &HP_FG_DEFAULT, &HP_Fifo },
{ &HP_FG_MAGENTA, &HP_FG_DEFAULT, &HP_Socket },
{ &HP_FG_BLUE,   &HP_FG_DEFAULT, &HP_Device },
{ &HP_FG_CYAN,   &HP_FG_DEFAULT, &HP_SymLink }
};
/* Array of escape sequences used when stdout is not a tty or when
 * stdout is a tty, but the terminal type is unknown or unsupported.
 * Notice the "escape sequences" in OPEN_FORMATS are all NONE which is
 * the empty string. This means when OPEN_FORMATS is used, no escape
 * sequences will be output. */
const FileColor OPEN_FORMATS[] = {
{ &NONE, &NONE, &NONE }, /* NoType */
{ &NONE, &NONE, &OPEN_Ordinary },
{ &NONE, &NONE, &OPEN_Directory },
{ &NONE, &NONE, &OPEN_Executable },
{ &NONE, &NONE, &OPEN_Fifo },
{ &NONE, &NONE, &OPEN_Socket },
{ &NONE, &NONE, &OPEN_Device },
{ &NONE, &NONE, &OPEN_SymLink },
};
const FileColor *FORMATS;
static const char options[] = "1ACFLRabcdgilmnoqrstux";
static void SetFormats(void) {
/* Set FORMATS to point to the correct array of escape sequences. */
const char *p;
FORMATS = OPEN_FORMATS;
if (isatty(STDOUT_FILENO)) {
if ((p = getenv("TERM")) != NULL) {
if (strcmp(p, "ansi_xterm") == 0 ||
strcmp(p, "color_xterm") == 0 ||
strcmp(p, "dtterm") == 0 ||   /* Default terminal shipped with CDE */
strcmp(p, "iris-ansi") == 0 ||/* SGI default terminal */
strcmp(p, "kterm") == 0 ||
strcmp(p, "nxterm") == 0 ||
strcmp(p, "rxvt") == 0 ||
(strncmp(p, "vt2", 3) == 0 && strlen(p) == 5)) {
FORMATS = ANSI_FORMATS;
}
else if (strcmp(p, "hp") == 0 || strcmp(p, "hpterm") == 0) {
FORMATS = HP_FORMATS;
}
}
}
}
```

APPENDIX 1-continued ls.c listing

```
static void Usage() {
fputs(
"ls version 1.8 - List contents of directories in color (see man ls).\n"
, stderr);
fprintf(stderr,
"Usage: ls [-%s] [files]\n"
"Directories are listed in %s; executables are %s; symbolic\n"
"links are %s; fifos are %s; and sockets are %s.\n",
options,
FORMATS[Directory].name->s, FORMATS[Executable].name->s,
FORMATS[SymLink].name->s, FORMATS[Fifo].name->s, FORMATS[Socket].name->s);
fputs(
"To determine terminal type (and thus escape codes for colors), ls\n"
"reads the \"TERM\" environment variable. ls works in the following\n"
"terminals: ansi_xterm, color_xterm, dtterm, hpterm, kterm, nxterm, and "
"rxvt.\n",
stderr);
exit(1);
}
static Int PrintFilename(int len, const FileInfo *e) {
/* Since FORMATS is already set up to point to the correct array of
 * escape sequences, we can simply output the color escape sequence
 * corresponding to the file type. */
fputs(FORMATS[e->type].on->s, stdout);
/* Output the filename. */
fputs(e->name, stdout);
/* Output the escape sequence to turn off the color. */
fputs(FORMATS[e->type].off->s, stdout);
return len + e->len;
}
static void ListCommandLine(int argc, char *argv[]) {
/* List the contents of directories (and files) given on the command
 * line here.
 *1. Use standard Unix functions, opendir(), readdir(), and closedir()
 * to read contents of the directories.
 *2. Sort the directory contents.
 *3. Use standard Unix functions stat() and lstat() to obtain
 * information about each file within the directories.
 *4. Call PrintFilename() above to print out each filename. */
}
int main(int argc, char *argv[]) {
static char *dotargv[] = { ".", NULL };
int c;
SetFormats();
while ((c = getopt(argc, argv, options)) != EOF) {
switch (c) {
/* Parse command line options here, e.g. -a -l.
.
.
. */
case 'a': break;
default: Usage();
break;
}
}
if (argc - optind > 0)
ListCommandLine(argc - optind, argv + optind);
else
ListCommandLine(1, dotargv);
return 0;
}
```

APPENDIX 2 term.cpp listing

```
#include <stdio.h>
#include <stdlib.h>
#include <string.h>
#include <unistd.h>
enum ColorE { Default, Black, White, Red, Green, Blue, Cyan, Magenta, Yellow };
enum AttrE { Normal = 0, Faint = 1, Bold = 2, Underline = 4, Blinking = 8,
Negative = 16 };
struct CnstStr
```

APPENDIX 2-continued term.cpp listing

```cpp
    size_t n;
    const char *s;
    operator const char *() const { return s; }
}
class Front {
public:
    Front() { }
    virtual ~Front();
    virtual void Default(FILE *out);
    /* Override these for your driver, if you want color escape
     * sequences printed out at the beginning and end of words. */
    virtual void WordForegrnd(FILE *out, ColorE fg);
    virtual void WordBackgrnd(FILE *out, ColorE bg);
    virtual void WordAttrs(FILE *out, AttrE a);
    /* Override these for your driver, if you want color escape
     * sequences printed out at the beginning and end of lines. */
    virtual void LineForegrnd(FILE *out, ColorE fg);
    virtual void LineBackgrnd(FILE *out, ColorE bg);
    virtual void LineAttrs(FILE *out, AttrE a);
};
    /* Override these tor your driver, if you want color escape
     * sequences printed out at the beginning and end of multi-line
     * blocks. */
    virtual void BlkForegrnd(FILE *out, ColorE fg);
    virtual void BlkBackgrnd(FILE *out, ColorE bg);
    virtual void Blk(Attrs(FILE *out, AttrE a);
};
class AnsiFront : public Front {
private:
    static const CnstStr ATTR_OFF FG_DEFAULT, BG_DEFAULT;
    static const CnstStr FOREGRND[], BACKGRND[];
    static const CnstStr BOLD_ON FAINT_ON, UNDERLINE_ON, BLINKING_ON
        NEGATIVE_ON, BOLD_FAINT_OFF, UNDERLINE_OFF,
        BLINKING_OFF, NEGATIVE_OFF;
public:
    virtual void Default(FILE *out);.
#undef FUNC_GROUP
#define FUNC_GROUP(group, out_param) \
    virtual void group##Foregrnd(out_param, ColorE f); \
    virtual void group##Backgrnd(out_param, ColorE b); \
    virtual void group##Attrs(out_param, AttrE a); \
    virtual void group##Attrs(out_param, ColorE f, ColorE b, AttrE a);
    FUNC_GROUP(Word, FILE *out)
    FUNC_GROUP(Line, FILE *out)
    FUNC_GROUP(Blk, FILE *out)
};
class HpFront : public Front
private:
    static const CnstStr FG_DEFAULT;
    static const Cnststr FOREGRND[];
public:
    virtual void Default(FILE *out);
    virtual void WordForegrnd(FILE *out, ColorE f);
    virtual void LineForegrnd(FILE *out, ColorE f);
class Driver {
private:
    Front *front;
public:
    Driver();
    ~Driver() { delete front; }
    void Default(FILE *out) { return front->Default(out); }
    /* Print color escape sequences at the beginning and end of words. */
    void WordForegrnd(FILE *out, ColorE fg) { front->WordForegrnd(out, fg); }
    void WordBackgrnd(FILE *out, ColorE bg) { front->WordBackgrnd(out, bg); }
    void WordAttrs(FILE *out, AttrE a) { front->WordAttrs(out, a); }
    /* Print color escape sequences at the beginning and end of lines. */
    void LineForegrnd(FILE *out, ColorE fg) { front->LineForegrnd(out, fg); }
    void LineBackgrnd(FILE *out, ColorE bg) { front->LineBackgrnd(out, bg); }
    void LineAttrs(FILE *out, AttrE a) { front->LineAttrs(out, a); }
    /* Print color escape sequences at the beginning and end of
     * multi-line blocks */
    void BlkForegrnd(FILE *out, ColorE fg) { front->BlkForegrnd(out, fg); }
    void BlkBackgrnd(FILE *out, ColorE bg) { front->BlkBackgrnd(out, bg); }
    void BlkAttrs(FILE *out, AttrE a) { front->BlkAttrs(out, a); }
};
/*--------------------------------------------*/
Front::~Front() {}
```

APPENDIX 2-continued term.cpp listing

```cpp
void Front::Default(FILE *, {}
void Front::WordForegrnd(FILE *, ColorE) {}
void Front::WordBackgrnd(FILE *, ColorE) {}
void Front::WordAttrs(FILE *, AttrE) {}
void Front::LineForegrnd(FILE *, ColorE) {}
void Front::LineBackgrnd(FILE *, ColorE) {}
void Front::LineAttrs(FILE *, AttrE) {}
void Front::BlkForegrnd(FILE *, ColorE) {}
void Front::BlkBackgrnd(FILE *, ColorE) {}
void Front::BlkAttrs(FILE *, AttrE) {}
/*----------------------------------------------*/
const CnstStr HpFront::FG_DEFAULT = { 5, "\x1b&v0S" };/* make white default */
const CnstStr HpFront::FOREGRND[] = {
{ 5, "\x1b&v0S" }, /* white is default */
{ 5, "\x1b&v7S" }, /* black */ { 5, "\x1b&v0S" }, /* white */
{ 5, "\x1b&v1S" }, /* red */ { 5, "\x1b&v2S" }, /* green */
{ 5, "\x1b&v4S" }, /* blue */ { 5, "\x1b&v6S" }, /* cyan */
{ 5, "\x1b&v5S" }, /* magenta */ { 5, "\x1b&v3S" }, /* yellow */
};
void HpFront::Default(FILE *out) { fputs(FG_DEFAULT, out); }
void HpFront::WordForegrnd(FILE *out, ColorE fg) {
const CnstStr *seq = &FOREGRND[fg];
fputs(seq->s, out);
}
void HpFront::LineForegrnd(FILE *out, ColorE fg)
(return HpFront::WordForegrnd(out, fg); }
/* It doesn't make sense to override the Blk routines for the Hpterm
 * driver because color escape sequences lose their effect after the
 * line they are printed on. */
/*----------------------------------------------*/
const CnstStr AnsiFront::ATTR_OFF = { 4, "\x1b[0m" },
     AnsiFront::FG_DEFAULT = { 5, "\x1b[39m" },
     AnsiFront::BG_DEFAULT = { 5, "\x1b[49m" },
const CnstStr AnsiFront::FOREGRND[] = {
{ 5, "\x1b[39m" }, /* default */
{ 5, "\x1b[30m" }, /* black */ { 5, "\x1b[37m" }, /* white */
{ 5, "\x1b[31m" }, /* red */ { 5, "\x1b[32m" }, /* green */
{ 5, "\x1b[34m" }, /* blue */ { 5, "\x1b[36m" }, /* cyan */
{ 5, "\x1b[35m" }, /* magenta */ { 5, "\x1b[33m" }, /* yellow */
};
const CnstStr AnsiFront::BACKGRND[] = {
{ 5, "\x1b[49m" }, /* default */
{ 5, "\x1b[40m" }, /* black */ { 5, "\x1b[47m" }, /* white */
{ 5, "\x1b[41m" }, /* red */ { 5, "\x1b[42m" }, /* green */
{ 5, "\x1b[44m" }, /* blue */ { 5, "\x1b[46m" }, /* cyan */
{ 5, "\x1b[45m" }, /* magenta */ { 5, "\x1b[43m" }, /* yellow */
};
const CnstStr AnsiFront::BOLD_ON = { 4, "\x1b[1m" }),
     AnsiFront::FAINT_ON = { 4, "\x1b[2m" }),
     AnsiFront::UNDERLINE_ON = { 4, "\x1b[4m" }),
     AnsiFront::BLINKING_ON = { 4, "\x1b[5m" }),
     AnsiFront::NEGATIVE_ON = { 4, "\x1b[7m" }),
     AnsiFront::BOLD_FAINT_OFF = { 5, "\x1b[22m" }),
     AnsiFront::UNDERLINE_OFF = { 5, "\x1b[24m" }),
     AnsiFront::BLINKING_OFF = { 5, "\x1b[25m" }),
     AnsiFront::NEGATIVE_OFF = { 5, "\x1b[27m" }),
void AnsiFront::Default(FILE *out) { fputs(ATTR_OFF, out); }
void AnsiFront::WordForegrnd(FILE *out, ColorE fg) {
const CnstStr *seq = &FOREGRND[fg];
fputs(seq->s, out);
}
void AnsiFront::WordBackgrnd(FILE *out, ColorE bg) {
const CnstStr *seq = &BACKGRND[bg];
fputs(seq->s, out);
}
void AnsiFront::WordAttrs(FILE *out, AttrE a) {
if (a & Faint) { fputs(FAINT_ON out); }
if (a & Bold) { fputs(BOLD_ON, out); }
if (a & Underline) { fputs(UNDERLINE_ON, out); }
if (a & Blinking) { fputs(BLINKING_ON, out); }
if (a & Negative) { fputs(NEGATIVE_ON, out); }
}
#undef STRM_GROUP
#define STRM_GROUP(class, group) \
void class::group##Foregrnd(FILE *out, ColorE fg) \
{ return class::WordForegrnd(out, fg); } \
void class::group##Backgrnd(FILE *out, ColorE bg) \
```

APPENDIX 2-continued term.cpp listing

```
{ return class::WordBackgrnd(out, bg); } \
void class::group##Attrs(FILE *out, AttrE a) \
{ return class::WordAttrs(out, a); } \
STRM_GROUP(AnsiFront, Line)
STRM_GROUP(AnsiFront, Blk)
/*---------------------------------------------*/
Driver::Driver() {
const char *p;
if (isatty(STDOUT_FILENO)) {
if ((p = getenv("TERM")) != NULL) {
if (strcmp(p, "ansi_xterm") == 0 ||
strcmp(p, "color_xterm") == 0 ||
strcmp(p, "dtterm") == 0 ||   /* Default terminal shipped with CDE */
strcmp(p, "iris-ansi") == 0 ||/* SGI default terminal */
strcmp(p, "kterm") == 0 ||
strcmp(p, "nxterm") == 0 ||
strcmp(p, "rxvt") == 0 ||
(strncmp(p, "vt2", 3) == 0 && strlen(p) == 5)) {
front = new AnsiFront;
return;
}
else if (strcmp(p, "hp") == 0 || strcmp(p, "hpterm") == 0) {
front = new HpFront;
return;
}
}
}
front = new Front;
}
/*---------------------------------------------*/
```

What is claimed is:

1. An apparatus comprising:
a computer and
a terminal window user-interface, coupled with the computer, having an extent of a plurality of text enhancement capabilities available to a user;
wherein the computer includes:
an analyzer for automatically determining the extent;
a generator of control signals to employ the enhancements within the extent; and
a transmitter of the control signals for conveyance thereof from the computer to the user-interface.

2. An apparatus as in 1 wherein the analyzer includes a file descriptor generator and evaluator.

3. An apparatus as in 2 wherein the analyzer is adapted for determining whether the file descriptor references a terminal window.

4. An apparatus as in 1 wherein the analyzer includes a environment variable generator and evaluator.

5. An apparatus as in 4 wherein the analyzer is adapted for accessing a set of records of terminal window types and for determining whether the environment variable corresponds to a member of the set.

6. An apparatus as in 5 wherein the control signal generator is adapted for determining control sequences based on the corresponding member record.

7. An apparatus as in claim 1 wherein the control signal transmitter is adapted for transmitting text having the control sequences embedded therein.

8. An apparatus as in claim 1 wherein the extent of enhancement capabilities of the user-interface includes color highlighting capabilities.

9. A method comprising:
providing a computer coupled with a terminal window user-interface having an extent of a plurality of text enhancement capabilities available to a user;
automatically determining the extent;
generating control signals to employ the enhancements within the extent and
transmitting the control signals from the computer to the user-interface.

10. A method as in 9 wherein determining extent includes generating a file descriptor and evaluating the file descriptor.

11. A method as in 10 wherein determining extent further includes determining whether the file descriptor references a terminal window.

12. A method as in 9 wherein determining extent includes generating a environment variable and evaluating the environment variable.

13. A method as in 12 wherein determining extent further includes determining whether the environment variable corresponds to a member of a set of records of terminal window types.

14. A method as in 13 wherein generating control signals includes determining control sequences based on the corresponding member record.

15. A method as in 14 wherein transmitting control signals includes transmitting text having the control sequences embedded therein.

16. A method as in 9 wherein generating control signals includes setting a global variable for indicating to its various functions that they should produce control sequences and which sequences.

17. A method as in 9 wherein generating control signals includes passing a variable to various text producing functions, where the functions are extended to check this variable and produce control sequences accordingly.

18. A method as in 9 wherein generating control signals includes setting function pointers to point to functions that produce control sequences.

19. A method as in 9 wherein generating control signals includes creating an instance of an object that produces the control sequences.

20. A method as in 9 wherein generating control signals includes setting a pointer to an array that contains the control sequences.

21. An article of manufacture comprising: a computer usable medium having computer readable program code embodied therein including:

code for automatically determining an extent of a plurality of text enhancement capabilities available to a user in a terminal window's text;

code for generating control signals to employ the enhancements within the extent; and code for transmitting the control signals to the user-interface.

* * * * *